United States Patent Office 3,439,147
Patented Apr. 15, 1969

3,439,147
METHOD OF AND APPARATUS FOR ARC WELDING TUBULAR MEMBERS TO FORM AN INTEGRAL PANEL
Frederick J. Winsor, Fanwood, and Stephen J. Resko, Carteret, N.J., assignors to Foster Wheeler Corporation, New York, N.Y., a corporation of New York
Filed Aug. 8, 1966, Ser. No. 570,852
Int. Cl. B23k 9/12
U.S. Cl. 219—125    9 Claims

ABSTRACT OF THE DISCLOSURE

A method and apparatus for welding together two tubes continuously and in parallel alignment, for forming a panel for use in a vapor generator, having a carriage supporting a roller adapted to roll along the top surface of said two tubes, the roller having two parallel tube grooves about its periphery adapted to fit on said two tubes for directing said two tubes in parallel alignment, said roller further including a wire guide groove, centrally located about the periphery of said roller and extending parallel to the two parallel tube grooves for receiving the wire and for guiding said wire in parallel alignment with said two parallel tubes. The carriage also supporting welding means for continuously welding the two parallel tubes together as they are held in parallel alignment by the roller.

In the construction of large vapor generators it has become common practice to construct large panels within the boiler shop and then connect these panels in their proper location at the construction site. The panels are formed from substantially parallel tubes with fins therebetween. Particularly in vapor generators of the once-through variety where high heat absorption is required, fins integrally formed with the tubes are required. In this way, higher heat conductivity is achieved through the fins.

Due to the size of modern day vapor generators and the immense amount of fin-tube surface area required, the total amount of fins is actually measured in miles for each vapor generator. Obviously, it is essential that such fin welds be of a high quality and that they be produced economically. To achieve this, automatic techniques must be developed which allow for a plurality of welds being made at one time and which eliminate manual operations.

In a prior patent of L. A. Maier, 3,221,135, assigned to the same assignee, a method is described for forming fin-tube panels. Certain embodiments of this invention involve the use of a solid rod or bar being placed on a flux backing. In accordance with this invention, a method and apparatus is provided for automatically obtaining a similar result.

This prior patent, although primarily directed to a fin-tube welding method utilizing granular weld elements as filler material, also includes the placing of a solid filler member over a flux backing. However, each filler member would have had to be individually placed in order to proceed in accordance with the method.

Others have envisioned the use of a filler wire but have restricted themselves to a metallic backing bar such as copper.

Therefore, it is an object of this invention to provide an improved automatic method and apparatus for forming fin-tube panels.

Other objects and advantages along with a fuller understanding of the invention may be had by referring to the following description and claims taken in conjunction with the accompanying drawings in which:

Figure 1:
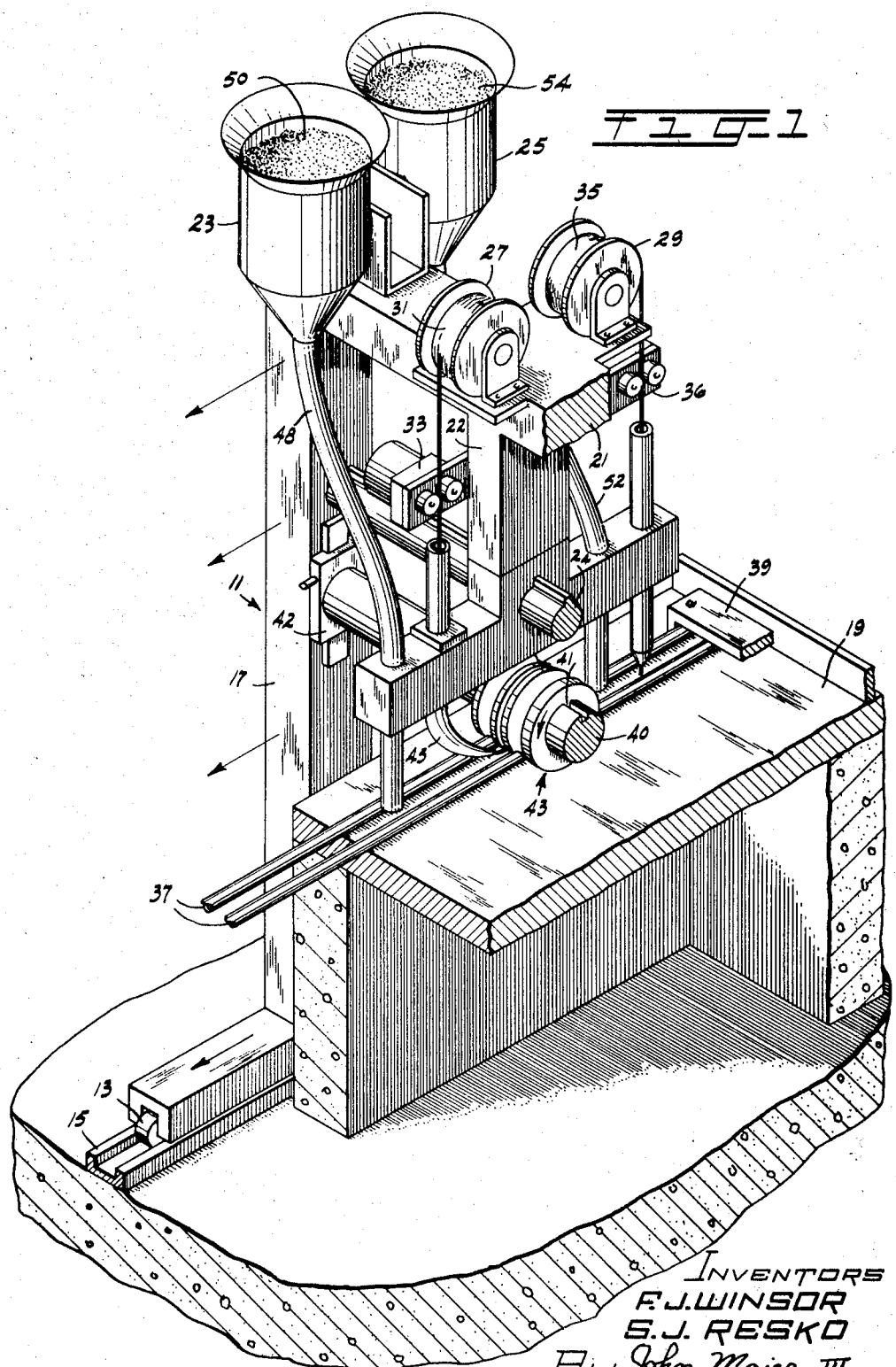
FIGURE 1 is an isometric view, partially broken away, depicting a single welding head of an apparatus in accordance with this invention.

Referring now to the drawings and particularly to FIGURE 1, a welding carriage 11 is shown mounted on wheels 13 which ride along tracks 15. The carriage 11 includes upright post 17 located on both sides of a welding surface 19. Only one post 17 is shown in FIGURE 1 as the outer post 17 is broken away for purposes of clarification. Between the posts 17 is a crossbeam 21. Extending downward from the crossbeam 21 is an inner frame 22. A support bar 24 extends through the frame 22 to the posts 17 to provide added rigidity. Supported on the crossbeam 21 is a granular backing material hopper 23 and a flux coating hopper 25 along with a filler wire reel 27 and an electrode reel 29. The filler wire reel 27 contains filler wire 31. The filler wire 31 may be either rectangular wire 31' or a round wire 31". The filler wire 31 is fed by a motorized drive mechanism 33. The electrode wire 35 may also be either a rectangular wire 35' or a round wire 35". The electrode reel 29 contains electrode wire 35. The electrode wire 35 is driven by a motorized wire drive mechanism 36.

Figure 2:
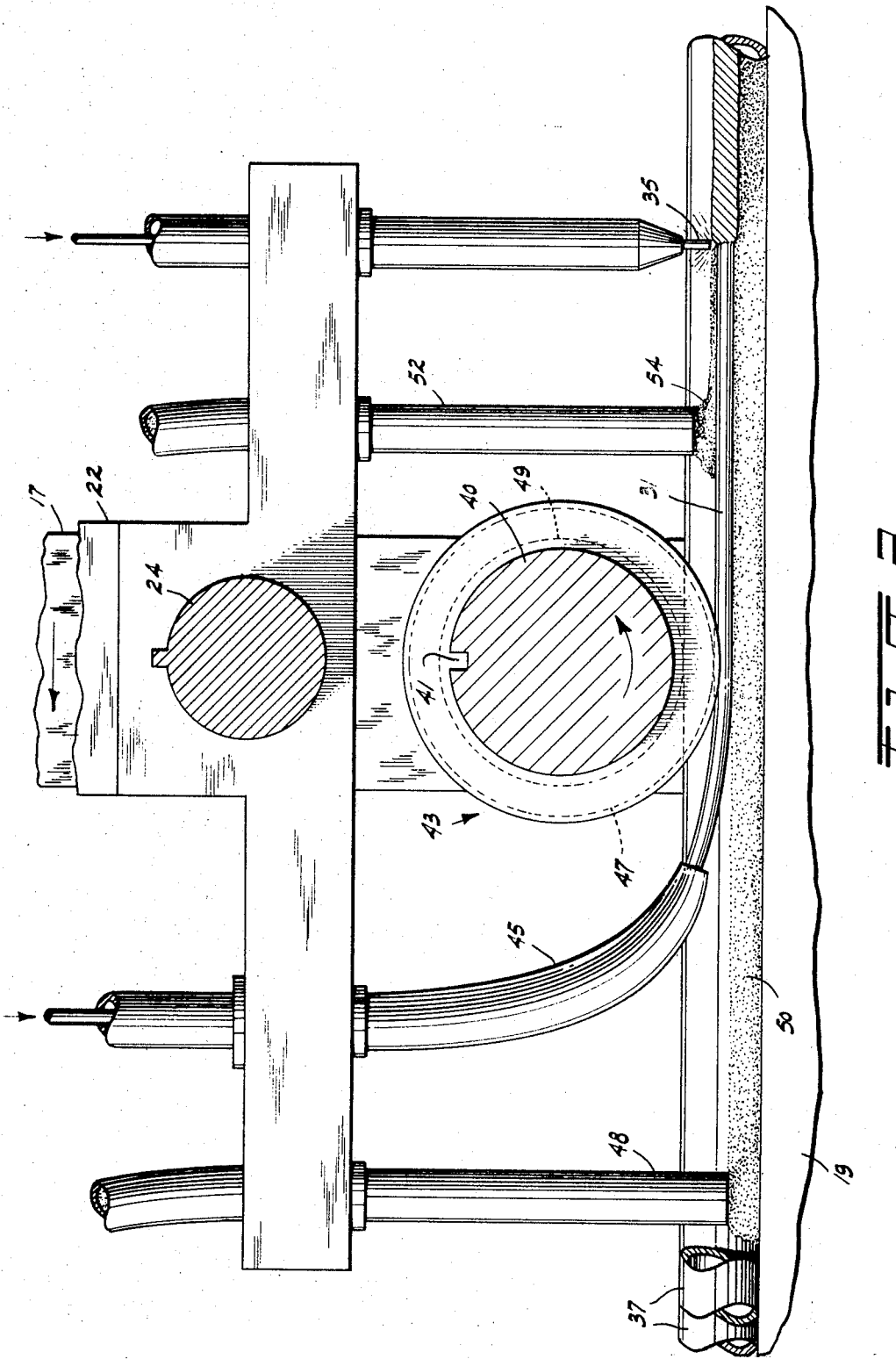
FIGURE 2 is an enlarged side elevation partially in cross-section of the section of the apparatus adjacent the weld area.
Figure 3:
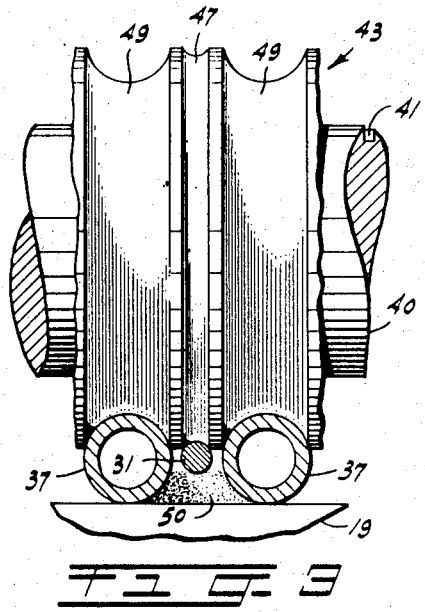
FIGURE 3 is a front elevation of the rollers in contact with the tubes in accordance with this invention.

Located on the welding surface 19 are two tubes 37. Of course, by duplicating the equipment described, numerous pairs of tubes 37 can be welded at one time. In feeding the filler wire 31 between the tubes, accurate placement of the filler wire 31 is most important. The tubes 37 are held in place by a clamp 39 to avoid movement which might adversely effect the weld quality. A roller shaft 40 is rotatably mounted on the two vertical posts 17. Mounted on the shaft 41, having a keyway 41 therein, is a wire guide roller 43. The vertical position of the shaft 40 is controlled by an adjustable bar 42 to raise the roller 43 when required, as for example, during setup. The filler wire 31 is fed through a wire guide 45 which bends the wire to nearly a horizontal position. As best seen in FIGURE 2, a center groove 47 (FIG. 3) in the guide roller 43 receives the wire and prevents it from sideway movement toward either tube 37. Tube grooves 49 in the guide roller 43 ride along the tubes 37 thereby assuring the correct location of the tubes 37 and the filler wire 31.

In the preferred embodiment, straight polarity, direct current is used. The filler wire 31 is connected to the ground along with the tubes 37. Since the process does not involve establishing a weld puddle into which the electrode 35 is fed and melted, the location of the arc in space is definitely determined by either the projected intersection of the electrode and the work or the projected intersection of the electrode and the cold wire or by both. The proportion of the total current carried by either the filler wire 31 or the tubes 37 depends upon the relative position of the projected intersection of the electrode 35 and tubes 37 and the electrode 35 and filler wire 31. If the projected intersection of the electrode 35 and filler wire 31 is established at some position appreciably above the plane coinciding with the axes of the parallel spaced tubes 37, the arc will exist entirely, or almost entirely between the electrode 35 and the filler wire 31. Under these circumstances, the filler wire 31 will carry all or nearly all of the ground current and there will be little or no fusion of the adjacent opposing tube surfaces. However, if the projected intersection of the electrode 35 and filler wire 31 is established at a position appreciably below the centerline plane of the tubes, the arc will tend to exist between the electrode 35 and the tubes 37. Therefore, it is apparent that the position of the projected intersection of the electrode 35 and filler wire 31 is important in establishing the location of the arc. In accordance with this invention, the roller 43 obtains the desired result.

In operation, the carriage moves along the table from right to left as shown by the directional arrows in FIGURES 1 and 2. A tube 48 extending from the bottom of the granular backing hopper 23 extends down to the space between the tubes 37 to deposit a granular backing 50 from the hopper 23 to support the molten weld puddle. The height of the tube 48 determines the depth of the granular backing 50. The filler wire 31 is fed downward and around under the roller 43 through the underside of the groove 47. The electrode 35 is fed downward, preferably substantially vertically, so as to consume the filler wire in its arc. Directly ahead of the electrode 35 is a tube 52 extending from the flux hopper so as to deposit a covering from the hopper 25 of submerged-arc flux 54.

Figure 4A:
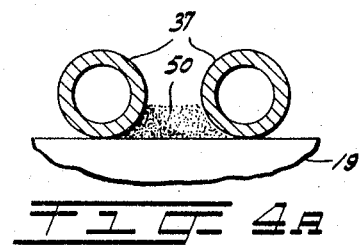
FIGURES 4a through 4d depict the various steps automatically carried out by the method and apparatus of this invention.
Figure 4B:
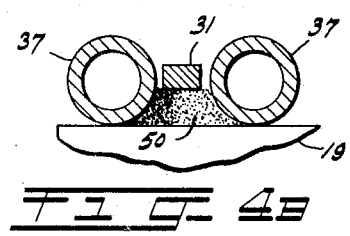
Figure 4C:
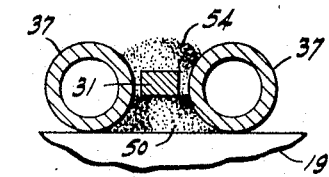
Figure 5:
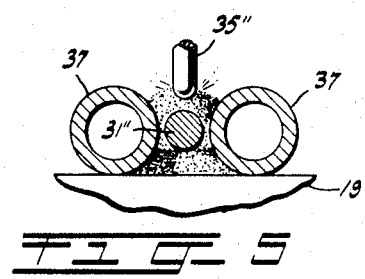
FIGURE 5 is an end view, similar to FIGURE 4d, showing a circular electrode and circular filler wire instead of the rectangular electrode and rectangular filler wire of FIGURES 4a through 4d.
Figure 4D:
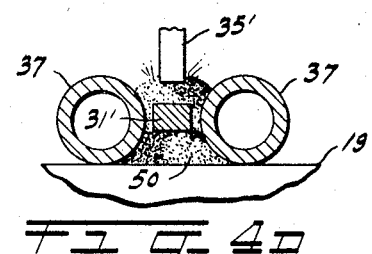
Figure 6:
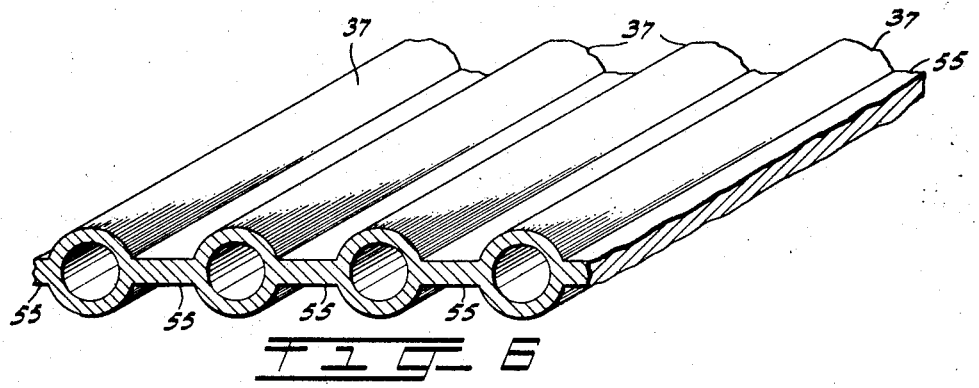
FIGURE 6 is a pictorial view of a completed fin-tube panel.

The sequence of steps is shown in FIGURES 4a through 4d. In FIGURE 4a the base of granular backing material 50 is shown in place. In FIGURE 4b, the rectangular filler wire 31' is fed over the top of the granular backing material. FIGURE 4c illustrates the submerged-arc flux 54 deposited over the filler wire 31' and the rectangular electrode 35' is seen in FIGURE 4d arcing to melt both itself and the filler wire to produce a fin 55 between the tubes 37. As previously pointed out the position of the projected intersection of the electrode 35 and the filler wire 31 is important in establishing the location of the arc. This in turn, is important in establishing the location of the fin 55 between the tubes 37. FIGURE 5 illustrates the same method as FIGURE 4d but with a round electrode 35" and filler wire 31". A square electrode 35' can be used with a round filler wire 31" and vice versa if desired depending upon the supply of materials and the width of the fin required.

A wide range of powdered or granulated materials are available for use as a backing material. Foundry sand or fire clay are suitable along with flux such as used in submerged-arc welding. Combinations are also possible such as welding flux intermingled with sand. Preferably, flux or sand mixed with flux are used as this provides a cleaner weld surface and ready removal from the solidified weld area.

It is to be understood that the above-described methods and arrangements are simply illustrations of the application of the principles of the invention. Numerous other methods and arrangements may be readily devised by those skilled in the art which will embody the principles of this invention and follow within the spirit and scope thereof.

What is claimed is:

1. An apparatus for welding together two tubes continuously and in parallel alignment along their adjacent longitudinal portions, comprising:
    means for supporting the two tubes longitudinal adjacent to each other;
    a carriage means for moving along the longitudinal axis of said two tubes;
    means mounted on said carriage means for supplying a layer of granular backing in the lower area between said two tubes;
    means mounted on said carriage means for supplying filler wire between the two tubes;
    a roller means mounted on said carriage means and adapted to roll along the top surface of said two tubes, said roller means having two parallel tube grooves therein about its periphery adapted to fit on said two tubes for directing said two tubes in parallel alignment, said roller means further including a wire guide groove centrally located about the periphery of said roller and parallel between said two parallel tube grooves for receiving the wire and for guiding said wire in parallel alignment with said two parallel tubes;
    means mounted on said carriage means for feeding said filler wire between the now two parallel tubes and under said roller means in contact with said roller wire guide groove of said roller means;
    means mounted on said carriage means for supplying a layer of welding flux over said filler wire between said two parallel tubes; and
    means mounted on said carriage means for feeding an electrode wire between said two parallel tubes, said electrode wire being directed to intersect with said filler wire.

2. An apparatus according to claim 1 wherein said two parallel tubes and said filler wire are connected to a common electrical potential.

3. An apparatus according to claim 1 wherein said means for supplying a layer of granular backing includes a hopper with a tube extending downward therefor, the lower end of said tube terminating at a point slightly below the centerline of said two parallel tubes.

4. An apparatus according to claim 3 wherein said means for supplying a layer of welding flux includes a hopper with a tube extending downward over the filler wire between the two parallel tubes.

5. An apparatus for welding together two tubes continuously and in parallel alignment along their adjacent longitudinal portions, comprising:
    a flat work surface for supporting the two tubes longitudinally adjacent to each other;
    a carriage means for moving along the longitudinal axes of said two tubes;
    a back-up hopper means mounted on said carriage means and including a back-up hopper tube extending downward between said two tubes to a point slightly below the centerline of said two tubes for supplying a layer of granular backing in the lower area between said two tubes;
    a filler wire supply assembly means mounted on said carriage for feeding a filler wire between said two tubes;
    a roller means mounted on said carriage means and adapted to roll along the top surface of said two tubes, said roller means having two parallel concave tube grooves therein about its periphery adapted to fit on said two tubes, said roller means further including a wire guide groove centrally located about the periphery of said roller between said two parallel concave tube grooves for receiving the wire and for guiding said wire in parallel alignment with said two now parallel tubes;
    said filler wire supply assembly means including a wire guide means located between said back-up hopper tube and said roller means, said wire guide means being adapted to direct the filler wire away from said roller means and under said roller means in contact with said wire guide grooves, said wire guide groove in said roller means holding said filler wire in place between said two now parallel tubes, said filler wire and said two parallel tubes having a common electrical potential;
    a covering hopper means mounted on said carriage means and including a covering hopper tube extending downward over the space between said two parallel tubes, said covering hopper tube being located on the side of said roller means opposite from said back-up hopper tube; and
    electrode wire supply assembly means mounted on said carriage means for feeding an electrode wire between said two parallel tubes to a point of intersection with said filler wire, said electrode wire supply assembly means being located on the side of said covering hopper tube remote from said roller means.

6. An apparatus according to claim 5 wherein both said filler wire and said electrode are rectangular in cross-section.

7. An apparatus according to claim 5 wherein both said filler wire and said electrode are circular in cross-section.

8. An apparatus according to claim 5 wherein said filler wire has a rectangular cross-section and said electrode has a circular cross-section.

9. An apparatus according to claim 5 wherein said filler wire has a round cross-section and said electrode has a rectangular cross-section.

References Cited

UNITED STATES PATENTS

| 2,265,943 | 12/1941 | Laig | 219—106 |
| 2,719,210 | 9/1955 | Chapman | 219—137 |
| 2,911,517 | 11/1959 | Armstrong | 219—125 |
| 2,993,983 | 7/1961 | Carpenter et al. | 219—124 |
| 3,059,099 | 10/1962 | Carpenter et al. | 219—137 |
| 3,221,135 | 11/1965 | Maier | 219—137 |
| 3,252,511 | 5/1966 | Gerber | 219—137 |
| 3,258,577 | 6/1966 | Smith | 219—125 |
| 3,342,973 | 9/1967 | Smith | 219—124 |

RICHARD M. WOOD, *Primary Examiner.*

W. DEXTER BROOKS, *Assistant Examiner.*

U.S. Cl. X.R.

219—137